July 9, 1946.  L. K. SWART  2,403,468
PROTECTION OF COMMUNICATION CIRCUIT ELEMENTS
Filed Sept. 22, 1944
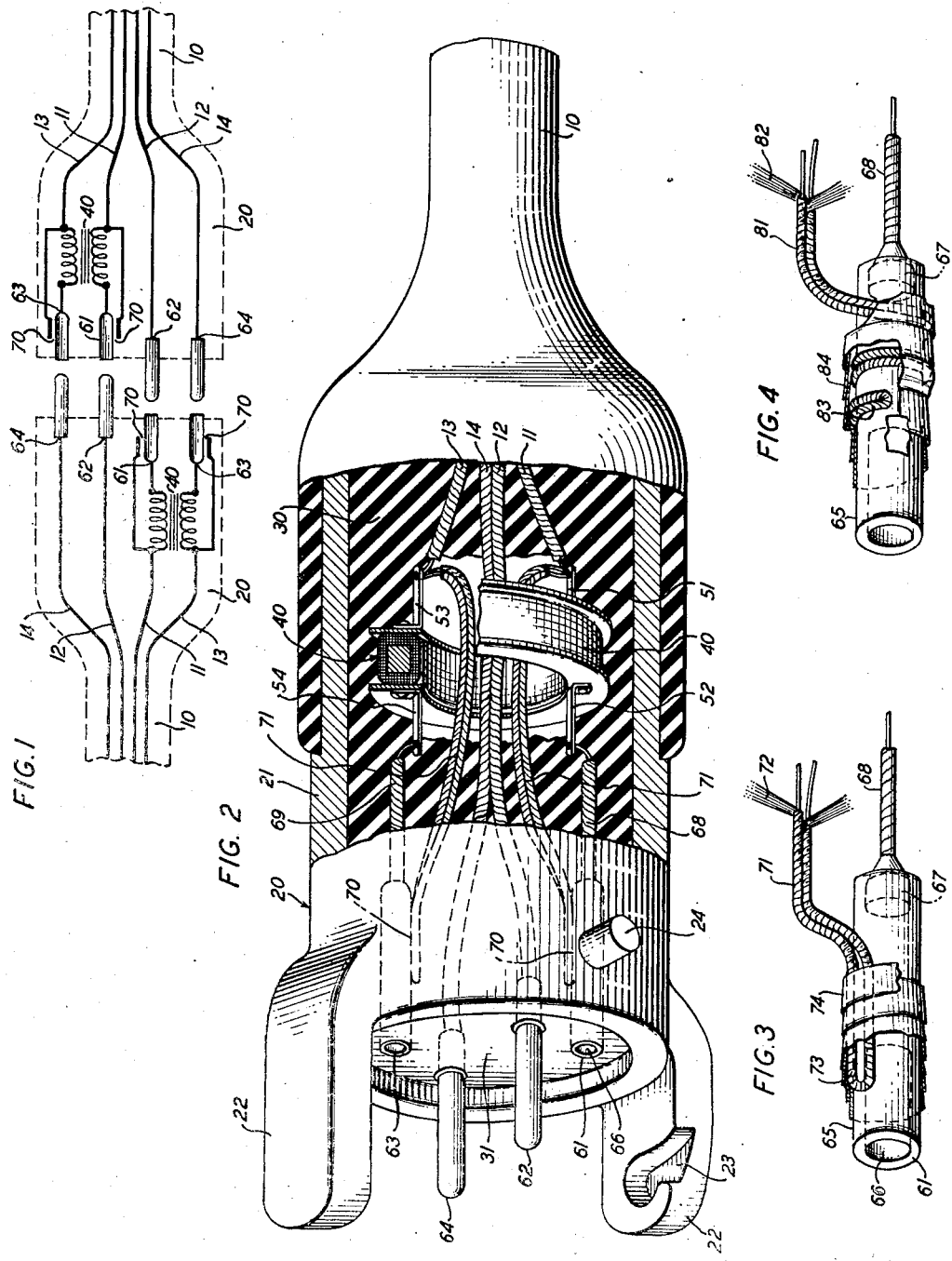
INVENTOR
L. K. SWART
BY
ATTORNEY Patented July 9, 1946

2,403,468

UNITED STATES PATENT OFFICE 2,403,468

PROTECTION OF COMMUNICATION CIRCUIT ELEMENTS

Leland K. Swart, Mountain Lakes, N. J., assignor to Bell Telephone Laboratories, Incorporated, New York, N. Y., a corporation of New York Application September 22, 1944, Serial No. 555,241

6 Claims. (Cl. 178—45)

This invention relates to protection of communication circuit elements, and more particularly to means for and methods of protecting circuit elements included in line circuits, subject to damage by currents of the nature of those produced by lightning.

For certain communication installations there may be and have been used certain portable cables laid in the open or lightly buried and sectionalized into convenient lengths which are interconnected by coupling or connector units. Different types of apparatus are inserted in these cables at different intervals, depending upon their nature and the transmission requirements.

Since the circuits of such installations may reach over considerable distances and cover large areas, they are subject to damage by lightning, especially where the cables are located on or in the ground. The nature and extent of the damage in each case, of course, depends upon the proximity of the cable to the point where lightning strikes. In the case of a direct hit, the discharge current may follow the cable for a considerable distance, and damage to the cable, as well as to the inserted apparatus, is practically unavoidable. However, in the more common case, when lightning strikes at some distance, induced currents will flow in the cable, the magnitude of which depends greatly upon the conductive condition of the surrounding earth or other media. Under these conditions the high conductivity of the cable conductors is not likely to establish voltages high enough to break through the cable insulation. However, most apparatus included in such cable circuits have appreciable impedance across which excess voltages will readily be set up, with the consequent breakdown of the associated insulation and with the possible interruption of service through the cable.

It is, therefore, a principal object of the invention to provide simple and effective protection of such apparatus against damage caused by discharge of over-voltages due to lightning discharges or, for that matter, due to any other cause.

Such cables often contain a quad of conductors. The circuits are frequently lump loaded by the inclusion of loading coils, suitably mounted inside the connector units, so that the loading may be automatically increased as a cable is extended by the addition of sections. It has been found that these loading coils are particularly susceptible to damage due to lightning.

It is, therefore, a more specific object of the invention to provide simple and effective protection against over-voltages for loading coils placed within the narrow confines of the connector units.

It is a further object of the invention to provide over-voltage protection of this nature which will have a breakdown voltage that may be depended on to remain constant under prolonged service, and which will be effective to permit unimpaired transmission, or to permit fairly satisfactory transmission during storms, at least until necessary repairs or replacement can be made.

It is a still further object of the invention to provide protection of this nature which will not interfere with normal operation and which may be inserted within the narrow confines of the connecting units without limiting the electrical and physical requirements already established in view of the rough handling incident to this type of service.

The invention will now be described more in detail as applied to a specific embodiment typical of the broader principles and features of the invention; and in this description reference will be made to the attached drawing, in which:

Fig. 1 is a diagrammatic representation of a pair of connector units showing end portions of the associated cables and arranged for quadded cables, and indicating the protection provided in accordance with the invention;

Fig. 2 is a perspective view of a connector unit for a quadded cable, with parts broken away to show details of its interior, and including the protecting means provided in accordance with the invention in the preferred form;

Fig. 3 is a detailed perspective view of a contacting member of the connector shown in Fig. 2, with the protecting means attached thereto; and Fig. 4 is a view similar to Fig. 3, showing an alternative form of the protecting means.

Referring now particularly to Fig. 1, the circuits and outlines for a pair of connector units 20—20 are shown diagrammatically with end portions of their associated quadded cables 10—10. Each cable 10 has a pair of individually insulated conductors 11 and 12, and another similar pair of conductors 13 and 14. The double winding loading coil 40, wound upon a toroidal core of suitable magnetic material, has its windings including in the conductors 11 and 13 of each pair. The cable circuits through the windings are terminated in female contacting members 61 and 63, respectively; and conductors 12 and 14 terminate in male contact members 62 and 64, respectively.

As will be described more in detail, each connector has an outer metal shell, having pins and lugs matching corresponding parts on its mate for a locking bayonet joint. The interior of the shell is filled with a molded compound of insulating material, entirely filling the space from the cable insulation, around the loading coil, to the end surface in which the contacting members 61—64 are mounted.

Upon joining of the pair of connector units, four separate circuits may be traced, from right to left, as follows:

Conductor 11, lower winding of coil 40, female contact 61, male contact 62, conductor 12,
Conductor 12, male contact 62, female contact 61, upper winding of coil 40, conductor 11,
Conductor 13, upper winding of coil 40, female contact 63, male contact 64, conductor 14, and
Conductor 14, male contact 64, female contact 63, lower winding of coil 40, conductor 13.

It will be observed that four continuous circuits are established in this manner, each including a winding of the two loading coils. These four circuits thus will provide paths for lightning induced currents and in each the sudden rise of current will induce a high voltage across the terminals of the included winding which usually breaks down the winding insulation and in most cases open-circuits the winding, thereby completely interrupting the transmission.

In accordance with the invention a by-path is provided for each winding which includes a breakdown gap 70 having a breakdown voltage lower than that of the winding. These gaps and their connections are embedded in the solid body of insulation filling the shell of the connector unit. The general arrangement of each gap is such that the metal parts on opposite sides of the gap are fixedly spaced apart to be separated by a thin layer of air or other dielectric which establishes the required breakdown voltage.

It has been found that by this provision of a protecting gap, discharges which break through the layer of air will in many cases leave the gap intact, but in cases of heavier discharges a conducting bridge is established across the gap which short-circuits its associated winding; however, it has been found that quite often a succeeding discharge will open the bridge across the gap and restore the circuit to normal efficiency of transmission. The protection may be made so effective that only in the cases of very heavy discharges, such as caused by very close or direct hits by lightning, the coil will be damaged, but in such cases the cable proper will usually also be damaged.

A practical and preferred embodiment of the invention is shown in Fig. 2 as applied to a connector unit now in extensive use for military purposes.

The connector unit 20 shown in Fig. 2 corresponds to one of the pair of mates shown in Fig. 1. This unit has been standardized and the protecting means incorporated therein is arranged in such a manner that the design of the connector unit would remain unaffected. Only the parts of a connector unit essential to the invention are illustrated in the drawing and even the illustrated parts are shown in somewhat simplified manner for the sake of simplicity.

The cable 10 includes the four line conductors 11, 12, 13 and 14 forming the two pairs of a quad. The cable is usually provided with an armoring protected by an outer abrasive layer, which are anchored to the shell of the connector unit.

The connector unit comprises an outer metallic shell 21 having a pair of lugs 22—22 with slots 23 and a pair of pins 24 (only one is shown), these parts being adapted to cooperate with similar parts on the mating unit to form a locking bayonet coupling.

The loading coil 40 is embedded in the solid body of insulation 30 which fills the interior of the shell 22. Portions of this shell are shown broken away in the drawing to reveal the elements in the interior and the insulating material is omitted in the immediate vicinity of the loaded coil for the sake of clearness. It should, however, be understood that the insulation 30 completely fills all spaces within and around the coil 40 and about the connections from the coil and the cable.

The single toroidal coil 40 in the unit has its two windings wound about a core of suitable magnetic material, such as permalloy, and connected into the cable circuit as shown schematically in Fig. 1. The metallic terminals 51 to 54 for the two windings are mounted on suitable washers of insulating material which may be held in position on the coil by means of taping. Thus, one winding is connected between the terminals 51 and 52 and the other between the terminals 53 and 54. Conductors 11 and 13 are connected to the terminals 51 and 53 respectively. Conductors 12 and 14 are brought through the center of the coil to the male contacting members 62 and 64. The female contacting members 61 and 63 are connected back to the terminals 52 and 54.

The female members 61 and 63 are completely embedded in the solid insulation 30 and are shaped as elongated rods 65, one of which is shown in detail in Fig. 3. The rod has a hole 66 with solid bottom for reception of the male contacting member from the mating unit. At the opposite end of the rod a hole 67 is provided for soldering of the connection 68 or 69, as the case may be, to the terminal 52 or 54. The male contacting members 62 and 64 are only partly embedded in the insulation and extend beyond the surface 31 of the insulating body for cooperation with the corresponding female members in the opposite unit. With this arrangement the mounting of the contacting members 61 to 64 is sufficiently elastic to allow for the short twisting movement necessary for the locking of the bayonet coupling.

The protecting means provided in accordance with the invention in one of its preferred forms, comprises a double-bent conductor 71 for each winding of the coil. As shown more in detail in Fig. 3, the conductor 71 has a single wrapping of cotton 72 and the end near the bight 73 is placed against the outer surface of the female contacting member 61 and held in position against it by means of a taping 74. At the opposite end the double conductor 71 is bared and soldered to the terminal 51 or 53.

Thus, a breakdown gap is established between the metal rod 61 connected to terminal 52 and the bight portion of the double conductor 71 connected to terminal 51 of the same winding. The spacing between the two sides of the gap is securely maintained by the cotton wrapping 72 and sufficient air is entrapped between the cotton fibers to form continuous paths across the gap for over-voltage discharges. The outer taping 74 serves the further purpose of preventing the compound 30 from replacing the air in the gap at the time the insulation is poured in liquid form into the connector shell.

With this arrangement the breakdown voltage of the gap may be accurately predetermined by the thickness of the cotton wrapping 72 and the amount of discharge current that the gap will carry without injury may be predetermined by the lateral extent of the opposed surfaces between the insulated wire 71 and the rod 65. It has been found that with greater separation there is less tendency for metallic particles to be carried across the gap and establish a permanent conducting bridge. By using air as the dielectric the widest gap is possible for practical purposes.

As shown in Fig. 2 the gap 70 is located on the side of the female terminal furthest away from the shell 20 in order not to reduce the effective insulation between the cable circuit and the grounded shell 21.

An alternative manner of forming the protecting gap is shown in Fig. 4 where the double conductor 81, insulated with the cotton wrapping 82, has its bight portion 83 wound with a few turns about the rod 65, the turns being held in position against the rod by the binding tape 84. An advantage of this arrangement over that in Fig. 3 is the greater gap surface which may be secured thereby.

As is well known, a single cotton wrapping easily unwinds from the conductor when the conductor is cut, and it is somewhat difficult to prevent that the layer be disturbed thereby for some distance from the cut. By the use of a double-bent conductor 71, it is insured that only an undisturbed portion of the conductor is used for the gap.

A protecting gap between two metal parts separated by spacing material admitting air to the gap may, of course, be formed in other manners than those shown in the drawing, without a departure from the spirit of the invention. Thus, instead of the double conductor 71 a single conductor may be used, provided precautions are taken against the free end accidentally making electrical contact with the rod 65 and against the wrapping being disturbed by raveling. Other separating materials besides cotton may be used, such as paper, which may be placed in the gap in any convenient manner without unduly reducing the air passages. It has, however, been found that ordinarily the gap must be very short to provide the necessary protection for the coils and that such short gaps may conveniently be established by a single wrapping of cotton, silk or the like. The outer covering 74 may alternatively be in the form of a sleeve of insulating material.

It should be understood, of course, that the means for and method of providing protection in accordance with the invention may be varied as to details and that the invention is applicable to connectors for cables with a single pair and including only a single winding, and also that the protection may be applied across other types of electrical elements than coil windings, where excessive voltages are likely to damage the equipment. The principles and essential elements of the invention are, however, those defined in the appended claims.

What is claimed is:

1. A communication circuit including a circuit element subject to interruption of the circuit therethrough by currents of the nature of those resulting from lightning and having terminals, and protecting means connected in shunt to said element at said terminals and comprising a conductor separated from one of said terminals by a light layer of fibrous insulation to establish a gap capable of breaking down under excessive voltages to pass current through said conductor in protection of said element, said element and protecting means being embedded in a mass of insulating material.

2. A communication circuit subject to lightning surges and including a reactive element having an input and an output terminal, and an over-voltage discharge path connected in parallel to said element at said terminals and comprising a pair of closely associated conducting elements, electrically separated by a thin layer of fibrous insulation to establish an air gap having a safe break-down voltage for protection of said element.

3. A sectionalized two-wire communication circuit including a pair of connector units between two adjacent sections of said circuit, each of said units comprising a connector body of insulating material, a loading coil serially included in said circuit and having a pair of terminals, a female contacting member embedded in said body and connected to one of said terminals, and over-voltage discharge means within the confines of said body and connected to form a path in parallel to said coil and comprising a piece of fiber-insulated conductor placed with its insulation in close engagement with a portion of said contacting member and electrically connected to the other of said terminals.

4. A long communication circuit subject to lightning surges and including a pair of connector units for interconnecting adjacent sections of said circuit, each of said units comprising a connector body of insulating material, a loading coil having a pair of terminals, a female contacting member connected to one of said terminals, a male contacting member, and over-voltage discharge means connected to form a discharge path around said coil and comprising a piece of fiber-insulated conductor having a double-bent portion placed with its continuous insulation in close engagement with a surface of said female contacting member and having a bared end portion electrically connected to the other of said terminals, said coil, female contacting member, and discharge means being embedded in said body of insulating material.

5. A loading coil having connecting means for connection into a communication circuit subject to over-voltage surges, a protecting circuit connected in shunt to said coil comprising two conducting elements closely associated and separated by a single layer of thin fibrous strands and a molded body of insulating material completely embedding said coil and protecting circuit.

6. An electric reactive element having connecting means for connection into a communication circuit subject to over-voltage surges, an air gap, two conducting elements delimiting said air gap, fibrous insulation in said air gap for spacing said conducting elements and connections from said conducting elements to opposite sides of said reactive element, respectively, for protection thereof against over-voltage, insulating holding means for holding said conducting elements in fixed mutual relation and a molded body of insulating material completely embedding said elements and enclosing said air gap.

LELAND K. SWART.